United States Patent [19]

Takahashi et al.

[11] Patent Number: 4,590,541
[45] Date of Patent: May 20, 1986

[54] ORGANIC SEMICONDUCTOR COMPOSITIONS AND SOLID ELECTROLYTIC CAPACITOR USING THE SAME

[75] Inventors: Shozo Takahashi, Kawasaki; Susumu Yoshimura, Tokyo; Junji Ozaki, Kyoto, all of Japan

[73] Assignee: Matsushita Electric Industrial Co., Ltd., Japan

[21] Appl. No.: 720,304

[22] Filed: Apr. 5, 1985

[30] Foreign Application Priority Data

| Apr. 6, 1984 | [JP] | Japan | 59-69340 |
| Apr. 6, 1984 | [JP] | Japan | 59-69339 |
| Apr. 6, 1984 | [JP] | Japan | 59-69338 |
| Jun. 1, 1984 | [JP] | Japan | 59-113331 |
| Jun. 1, 1984 | [JP] | Japan | 59-113326 |

[51] Int. Cl.$^4$ ............................................. H01G 9/05
[52] U.S. Cl. .................... 361/433; 252/62.2; 252/62.3 Q
[58] Field of Search ............... 361/433; 29/570; 252/62.2, 62.3 Q

[56] References Cited

U.S. PATENT DOCUMENTS 3,708,424  1/1973  Yoshimura et al. ............... 361/433
3,872,358  3/1975  Murakami et al. ............... 361/433

FOREIGN PATENT DOCUMENTS 3214355  12/1982  Fed. Rep. of Germany .

Primary Examiner—L. T. Hix
Assistant Examiner—Douglas S. Lee
Attorney, Agent, or Firm—Lowe, Price, Leblanc, Becker & Shur

[57] ABSTRACT

Organic semiconductor compositions comprising CN group-bearing semiconductive salts and an additive capable of suppressing evolution of a toxic gas such as HCN upon excessive heating of the salts. The additive is selected from polyhydric alcohols, saccharides, and fine powder of metals such as iron, nickel and cobalt. Solid electrolytic capacitors using the organic semiconductor compositions are also described.

37 Claims, 1 Drawing Figure

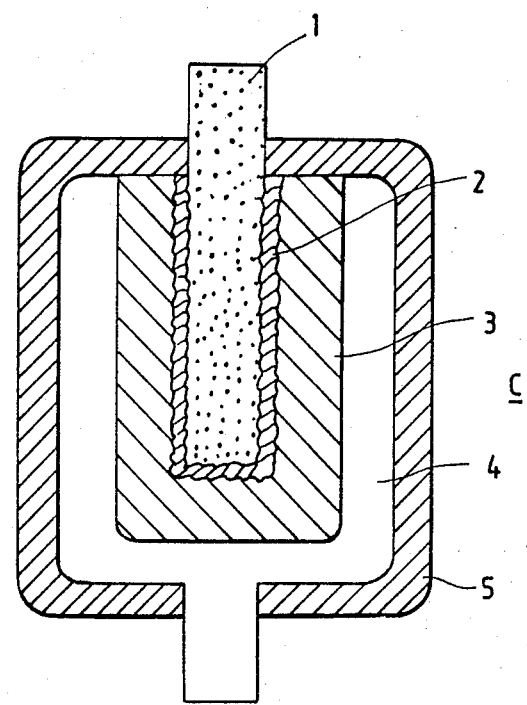

ORGANIC SEMICONDUCTOR COMPOSITIONS AND SOLID ELECTROLYTIC CAPACITOR USING THE SAME

BACKGROUND OF THE INVENTION

1. Field of the Invention

This invention relates to semiconductive compositions which comprise nitrile group-bearing organic semiconductors such as 7,7,8,8-tetracyanoquinodimethane radical ion salts and more particularly, to organic semiconductor compositions which are improved to suppress, to a minimum, toxic gases from generating at the time of thermal decomposition or combustion of nitrile group-bearing organic semiconductors. The invention also relates to a solid electrolytic capacitor utilizing such improved organic semiconductor compositions.

2. Description of the Prior Art

A number of organic semiconductive compounds are known in the art, typical of which are intermolecular compounds or salts comprising, as an acceptor, nitrile group-bearing organic materials such as 7,7,8,8-tetracyanoquinodimethane, dicyanodichloroparaquinone, tetracyanoethylene, tetracyanonaphthoquinone, and the like. For instance, 7,7,8,8-tetracyanoquinodimethane (hereinafter abbreviated as TCNQ) is a highly electrophilic compound or acceptor which has four nitrile groups ($-C\equiv N$) in one molecule thereof. The TCNQ compound readily forms intermolecular compounds or salts with a number of compounds or donors having a low ionization potential, thereby obtaining organic semiconductors having low electric resistance. Such organic semiconductors have relatively high thermal stability though low in electric resistance, so that a number of applications to electronic elements have been heretofore proposed. For example, the TCNQ-base semiconductors have been applied as temperature sensors utilizing the temperature change of the resistance, solid electrolytes utilizing the low resistance and electrochemical activity, logic, memory or recording elements utilizing the switching function in resistance of the semiconductor in response to electric field or light, and display elements utilizing the color change in oxidation and reduction reactions.

In recent years, many electric appliances have been now digitalized. Thus, there is a high demand for capacitors of the type which have a low impedance in a high frequency range and are small in size but large in capacitance. TCNQ and analogous compounds are considered to be very promising as a solid electrolyte for solid electrolytic capacitor of the small-size and large-capacitance type.

The organic semiconductors are dissolved in organic solvents or melted on heating, so that it is possible to apply the semiconductor to an oxide film of a capacitor by dipping. This is very advantageous in that a capacitor having a large capacitance and a good high frequency characteristic can be fabricated using the organic semiconductors without impeding the oxide film by thermal decomposition of a salt as will be experienced in known aluminum or tantalum solid electrolytic capacitors.

DOS No. 3,214,355 describes a solid electrolyte consisting of N-n-propyl or N-iso-propylisoquinoline and TCNQ. In this patent application, the TCNQ ion radical salt is melted and impregnated in a convolutely wound aluminum electrolytic capacitor, thereby permitting strong bonding of the TCNQ salt to the oxide film. The resulting aluminum solid electrolytic capacitor has much improved frequency and temperature characteristics partly owing to the high conductivity of the TCNQ salt. In general, TCNQ ion radical salts have higher conductivity and higher anodizability than manganese dioxide or other inorganic oxides, so that solid electrolytic capacitors using such TCNQ salts have better frequency and temperature characteristics than known solid electrolytic capacitors using inorganic oxides and particularly manganese oxide.

Electronic elements utilizing TCNQ do not produce any problems on safety when used under ordinary conditions. However, if the elements are excessively heated, for example, by fire or by passage of overcurrent, there is a great possibility of evolving toxic gases. More particularly, four CN groups exist in the TCNQ molecule (molecular weight: 204). The bonding between C and N in the CN group is so strong that when thermal decomposition takes place, hydrogen cyanide, HCN, having a molecular weight of 27, may evolve. If four CN groups are all converted into HCN, 529 mg of HCN generates per unit gram of the TCNQ molecule. The TCNQ molecule itself is sublimable and thus may be scattered in air prior to decomposition when heated. However, organic semiconductor of TCNQ obtained by reaction with various donors invariably undergo thermal decomposition when allowed to stand at temperatures as high as about 250° C. or over. This thermal decomposition is an exothermic reaction, so that the temperature of an organic semiconductor itself rises at the time of the decomposition. Accordingly, the decomposition temperature reaches a range of from approximately 300° to 500° C. regardless of an initial temperature at which the decomposition takes place. It is known that the above temperature range is an optimum conditions where hydrogen cyanide is most likely to evolve upon burning of nitrogen-containing organic compounds. Where organic semiconductors comprising TCNQ are heated by some origins, it should be taken into account for fabrication of electronic elements using such organic semiconductors that very toxic hydrogen cyanide gas may generate. In fact, it has been confirmed by the gas mass spectroscopy that when quinolinium(TCNQ)$_2$, known as a compound having a low resistance, is thermally decomposed in air, hydrogen cyanide and acetonitrile, CH$_3$CN, chiefly evolve. In particular, the quantitative analysis based on the method prescribed in JIS K0109 (i.e. pyridine-pyrazolone spectrophotometry) revealed that 4 wt% of hydrogen cyanide was generated. This value is far much lower than the theoretical amount of 53% and corresponds to a concentration of about 4 ppm when, for example, 100 mg of the TCNQ salt is thermally decomposed in a space of 1 m$^3$. From the standpoint of the safety standard for working environments, such a value may be within a tolerance limit. In some cases, however, a local concentration may become very high, so that generation of hydrogen cyanide at the time of thermal decomposition of TCNQ salts should be suppressed to a minimum.

It is known that when electrolytic capacitors are inversely connected, a great current flows therethrough and thus the temperature of the electrolyte rises, causing abnormalities such as breakage of the capacitor. We confirmed that when an aluminum electrolytic capacitor using a solid electrolyte of N-n-butylisoquinolinium(TCNQ)$_2$ was applied with a current of 1 A, it was broken down in about 30 seconds while blowing off the decomposed semiconductor. The evolved gas was collected in a one liter glass container and subjected to measurement of HCN, with the result that the amount of the gas was 2,000 ppm.

SUMMARY OF THE INVENTION

An object of the invention is to provide organic semiconductor compositions which comprise CN group-bearing organic semiconductors and an additive capable of suppressing evolution of toxic gases such as hydrogen cyanide when the composition undergoes thermal decomposition.

Another object of the invention is to provide a solid electrolytic capacitor using organic semiconductor compositions of the above type whereby evolution of hydrogen cyanide is suppressed when the organic semiconductor composition in the capacitor undergoes thermal decomposition.

A further object of the invention is to provide a solid electrolytic capacitor which is small in size and large in capacitance.

The organic semiconductor composition of the invention comprises a CN group-bearing organic semiconductive ion radical salt and an additive capable of suppressing evolution of toxic gases upon thermal decomposition of the organic semiconductive salt. The additive is a member selected from the group consisting of polyhydric alcohols, saccharides, metallic powders, and mixtures thereof. Polyhydric alcohols may be used in combination with a metal catalyst in order to further improve the suppressing effect. The additive may be added to a powder of the organic semiconductive salt in the form of a powder, or may be first melted and applied to the organic semiconductive powder such as by dipping.

The organic semiconductor composition of the invention is particularly effective when used in a solid electrolytic capacitor of the type which comprises a first electrode of a valve metal having an anodized film on the surface thereof, a second or counter electrode provided in spaced relation with the first electrode, and a solid electrolyte consisting of the organic semiconductor composition. The solid electrolyte may further comprise a resin binder, if necessary. The valve metal may be aluminum, tantalum, titanium or alloys thereof.

BRIEF DESCRIPTION OF THE DRAWING

A sole FIGURE is a schematic, sectional view of a solid electrolytic capacitor according to the invention.

DETAILED DESCRIPTION AND EMBODIMENTS OF THE INVENTION

As described before, the CN group-bearing organic semiconductive ion radical salts will generate extremely toxic hydrogen cyanide when heated from some causes. We have found that the generation of hydrogen cyanide can be suppressed to a substantial extent when polyhydric alcohols, saccharides, metallic powders and mixtures thereof are added to the organic semiconductive salts in suitable amounts.

The CN group-bearing organic semiconductive ion radical salts used in the present invention are composed of nitrile group-bearing organic acceptors and donors. Typical of the nitrile group-bearing organic acceptors is TCNQ, which is preferably used in the practice of the present invention. Aside from TCNQ, dicyanodichloroparaquinone, tetracyanoethylene and tetracyanonaphthoquinone may be also used as the acceptor. On the other hand, examples of the donors include metallic ions such as ions of Li, K, Cs, Ba, Ca, Cu and the like, ammonium, pyridinium, quinolinium, isoquinolinium, phenazinium, acridinium, phenothiazinium, tetrathiafulvalenium, and tetraselenafulvalenium. As a matter of course, these organic donors may have any suitable substituents such as normal alkyl groups such as propyl, butyl, pentyl, hexyl and the like. Cu ions include Cu(I) and Cu(II) ions.

One of additives capable of suppressing evolution of hydrogen cyanide is polyhydric alcohols. As will be described hereinafter, the hydroxyl groups in the polyhydric alcohols principally contribute to the suppression. In this sense, any compounds having at least one hydroxyl group may be used in the practice of the invention. However, in order to ensure a satisfactory suppression effect, the hydroxyl groups in one molecule should preferably be as large as possible. In addition, electronic devices using these organic semiconductors are not necessarily used only at a normal temperature, and thus the melting point of the additives should preferably be as high as possible. A preferable melting point is 100° C. or higher. This is why polyhydric alcohols are used. Specific and preferable polyhydric alcohols include pentaerythritol (melting point: 260° C.), erythritol (melting point: 122° C.), sorbitol (melting point: 100° C.), mannitol (melting point: 166° C.), and glucose (melting point: 146° C.). In some cases, low melting dialcohols such as glycol may be used. The amount of the polyhydric alcohol is generally 5 wt% or more of the TCNQ salt. However, too much amounts are unfavorable because the properties of the semiconductive salts are impeded. For instance, when the amount exceeds 60 wt%, the semiconductive composition abruptly turns into an insulating composition. Accordingly, the polyhydric alcohol is used in an amount of from 5 to 60 wt% of the salt.

Saccharides which are another type of additive may be all saccharides including low molecular weight saccharides such as monosaccharides and oligosaccharides, and polysaccharides, such as starch, from which a number of lower molecular weight saccharides may be produced by hydrolysis. As described before, the additives should conveniently have high melting points, preferably 100° C. or higher. Fructose, which is a monosaccharide, has a melting point of 102° C., and sucrose, which is a disaccharide, has a 185° C. Most saccharides have thus melting points over 100° C. Thus, a wide variety of saccharides including from mono and oligosaccharides to polysaccharides can be used.

The amount of saccharides is generally 2 wt% or more of the salt. For the reasons similar to polyhydric alcohols, the upper limit is 60 wt% of the salt.

A further type of additive includes powders of metals such as iron, nickel, cobalt or mixtures thereof. These powders may be supported in alumina or diatomaceous earth.

We confirmed through a number of thermal decomposition tests and analyses of evolved gases that the additives described above had good effects of suppressing evolution of hydrogen cyanide when organic semiconductors underwent thermal decomposition. Although the additive materials were selected experimentally, the suppression effect of the additives is considered for the following reasons in which TCNQ ion radical salts are illustrated for convenience' sake.

It is assumed that when a TCNQ ion radical salt is thermally decomposed, some radicals, R., will be released from the molecule and induce a chain transfer reaction, thereby causing a rapid endothermic decomposition reaction to occur. The decomposition temperature of TCNQ salts is approximately 280° C. At the time when the thermal decomposition takes place, the salt is heated to temperatures higher than the decomposition temperature. When the melting point of polyhydric alcohols is lower than the decomposition temperature, the alcohol melts prior to commencement of the thermal decomposition of the TCNQ salt, thereby covering the salt with the melt. Presumably, the melt catches the radicals released by the thermal decomposition of TCNQ salt and thus serves as a chain transfer reaction terminator, thereby suppressing the decomposition of TCNQ. It is considered that the hydroxyl groups in the alcohol have the function of withdrawing hydrogen from the organic semiconductor and accelerate carbonization of the semiconductor.

Saccharides also melt at temperatures below the decomposition temperature of TCNQ ion radical salt semiconductors and cover the semiconductor therewith similar to the case of polyhydric alcohols. Saccharides also serve as a chain reaction terminator. It is well known that carbon is a good absorber for hydrogen cyanide. If the melted saccharide is caramelized and rapidly carbonized, it is considered that the carbonized saccharide serves effectively as an absorber for the hydrogen cyanide gas released by decomposition of the organic semiconductor.

Fine powders of the defined metals have each strong absorptivity for HCN. Upon contact with HCN, these metals form corresponding cyanides, which are relatively stable. If oxygen, hydrogen or water further exists, these metals are considered to effectively act as an oxidation, reduction or hydrolysis catalyst for HCN.

The metallic powder should have a size as small as possible in order to satisfactorily show the activity. We conducted a test using a number of metallic powders having different sizes and found that very fine particles of iron, cobalt or nickel having a size of 500 angstrom or below give a remarkable suppression effect when added in an amount of 5 wt% or more. Larger amounts are more preferable when only suppression of HCN is taken into account. However, when fine metallic particles are used in large amounts, they contact with one another with a loss of useful characteristics of organic semiconductors. Metallic particles start to contact significantly with one another in the composition when contained in TCNQ ion radical salts in an amount exceeding 20 wt%. Accordingly, the amount is in the range of from 5 to 20 wt% of the salt.

If two or more of polyhydric alcohols, saccharides and metallic powders are used in combination, the tool amount should be suitably determined within ranges of the respective components.

Especially, when polyhydric alcohols are used as the additive, evolution of hydrogen cyanide can be reduced to a further extent by adding a metal catalyst. As described before, polyhydric alcohols have the functions of heat absorption, inhibition of the chain transfer reaction in the decomposition of TCNQ or the like acceptors, acceleration of carbonization, and addition of the alcohol to the nitrile groups, thereby suppressing evolution of HCN from the acceptor. These functions are promoted by addition of a certain type of metal catalyst to the extent that little or no HCN evolves. The metal catalyst is, for example, iron, cobalt, nickel, copper or mixtures thereof. The metal is used in the form of fine particles. These particles may be used as they are, or as supported on alumina or diatomaceous earth. The amount of the metal catalyst is in the range of 1 to 10 wt% of the salt. The upper limit may, more or less, depend on the amount of polyhydric alcohol.

Reference is now made to the sole FIGURE in which there is shown a solid electrolytic capacitor C. The capacitor C includes an anode 1 of a valve metal such as aluminum or tantalum. The anode 1 has a dielectric oxide layer 2 which is formed by anodizing the anode 1 in a barrier electrolytic solution such as an ethylen glycol solution after suitable surface treatment of the anode 1. Reference numeral 3 designates an organic semiconductor composition of the invention, which completely covers the dielectric oxide layer 2 on one side thereof. A cathode 4 is provided to directly contact with the other side of the semiconductor composition 3 to form a capacitor element. Reference numeral 5 indicates a casing such as, for example, of aluminum, for the capacitor element.

The solid electrolyte 3 may be any organic semiconductor compositions described before, by which when the capacitor is excessively heated, evolution of toxic HCN gas is fairly suppressed. Preferably, quinolinium-(TCNQ)$_2$, N-methylphenazinium(TCNQ), N-methylacridinium-(TCNQ)$_2$, and tetrathiafulvalenium(TCNQ) are used along with resin binders as dissolved in any suitable solvents and applied as a solution. In this case, resin binders such as polyvinyl butyral, polyvinylpyrrolidone and polyacrylonitrile are added in an amount of from 2 to 50 wt% of the TCNQ salt. Alternatively, melt-type semiconductors such as complex salts comprising one molecule of quinoline or iso-quinoline substituted at the N position with a normal alkyl group such as, for example, propyl, butyl, pentyl or hexyl and two molecules of TCNQ are also preferably used. These complex salts are melted and applied to a capacitor by dipping. Specific examples of the complex salts include N-n-propylquinolinium(TCNQ)$_2$, N-n-butylisoquinolinium(TCNQ)$_2$ and the like. The additives may be those described hereinbefore with respect to the semiconductor composition.

The present invention is described by way of examples.

EXAMPLE 1

2 mg of each of polyhydric alcohols including pentaerythritol, sorbitol, mannitol and glucose and 8 mg of N-n-butyl-isoquinolinium(TCNQ)$_2$ were powdered and mixed in a mortar, followed by placing in a glass tube, sealing the tube along with air, and heating at 300° C. for about 10 minutes. When the temperature in the glass tube reached 300° C., the mixtures were melted and decomposed in 10 to 60 seconds after the melting. Although the glass tubes were, in some case, bursted simultaneously with the decomposition, the gas evolved by the decomposition was introduced into another glass container and subjected to measurement of an amount of HCN contained in the gas according to the gas chromatography, a technique using Kitagawa's detector tube, and the spectrophotometry (JIS K109).

The amounts of HCN evolved from semiconductor compositions using various polyhydric alcohols are shown in Table 1.

TABLE 1

| Polyhydric Alcohol | Amount (%) | Amount of HCN (mg) | Burst of Tube |
| --- | --- | --- | --- |
| Nil | — | 4.2 | yes |
| Pentaerythritol | 2 | 4.0 | yes |
| " | 4 | 3.8 | yes |
| " | 5 | 1.0 | no |
| " | 10 | 0.8 | no |
| " | 50 | 0.4 | no |
| " | 60 | 0.3 | no |
| Sorbitol | 5 | 0.9 | no |
| " | 20 | 0.3 | no |
| Mannitol | 20 | 0.4 | no |
| Glucose | 20 | 0.5 | no |

The above procedure was repeated using erythritol, with results similar to those results of pentaerythritol.

As will be seen from the above results, evolution of HCN can be suppressed to a substantial extent when polyhydric alcohols are added in an amount of 5 wt% or over based on the TCNQ salt.

EXAMPLE 2

K(TCNQ) was used as the TCNQ salt, to which 10 wt% of pentaerythritol was added and mixed at 265° C., whereupon the mixture uniformly melted. The mixture was thermally decomposed in the same manner as in Example 1 to measure an amount of HCN generated upon the decomposition. As a result, it was found that 0.15 $\mu$g of HCN per mg of the composition and was thus much lower than 2 $\mu$g in the case where no additive was added.

EXAMPLE 3

1.5 g of mannitol was added to 8.5 g of N-methyl-phenazinium(TCNQ), followed by adding 2 g of polyvinyl butyral dissolved in benzyl alcohol. The resulting solution was applied onto a ceramic substrate by a printing method to form a conductive film thereon. 1 mg of the film was sampled and thermally decomposed in the same manner as in Example 1, with the result that 0.10 $\mu$g of HCN was contained. In case where no mannitol was added, HCN was evolved in an amount of 3 $\mu$g. Thus, the effect of the additive was found to be pronounced.

EXAMPLE 4

100 parts by weight of N-n-butyl-isoquinolinium(TCNQ)$_2$, used as an organic semiconductor, 2 to 20 parts by weight of pentaerythritol, and fine powders of iron, cobalt, nickel and copper catalysts in different amounts were each mixed in a mortar. The resulting mixtures were each placed in a glass tube and the tube was hermetically sealed along with air, followed by heating at 300° C. for about 10 minutes. The above compositions melted when the content in each glass tube reached 300° C., and were violently decomposed in 10 to 60 seconds after the melting. Although the glass tubes were, in some case, bursted simultaneously with the decomposition, the gas evolved by the decomposition was introduced into another glass container and subjected to measurement of an amount of HCN contained in the gas according to the gas chromatography, a technique using Kitagawa's detector tube, and the spectrophotometry (JIS K109). The results are shown in Table 2, in which the content of HCN is expressed as weight percent based on the TCNQ salt used.

TABLE 2

| Amount of Pentaery-thritol (parts by weight) | Catalyst Metal | Catalyst Amount (parts by weight) | Amount of HCN (%) | Burst of Tube |
| --- | --- | --- | --- | --- |
| — | — | — | 4.2 | yes |
| 2 | — | — | 4.0 | yes |
| 2 | nickel | 1 | 3.8 | yes |
| 3 | — | — | 3.9 | yes |
| 3 | nickel | 1 | 2.5 | yes |
| 3 | nickel | 5 | 1.0 | no |
| 5 | iron | 5 | 0.5 | no |
| 10 | nickel | 5 | 0.098 | no |
| 20 | nickel | 10 | 0.041 | no |
| 20 | nickel | 15 | 0.035 | no |
| 20 | iron | 5 | 0.080 | no |
| 20 | iron | 10 | 0.032 | no |
| 20 | iron | 15 | 0.028 | no |
| 20 | cobalt | 10 | 0.045 | no |
| 20 | copper | 10 | 0.035 | no |

As will be seen from the above results, the effect of pentaerythritol is much improved when the metal catalysts are added in an amount of from 1 to 10 parts by weight per 100 parts of the TCNQ salt. The effects of the catalyst are summarized as follows: (1) an amount of pentaerythritol or polyhydric alcohols can be reduced; and (2) the evolution of HCN can be suppressed to an extent of 99% or over.

When an amount of pentaerythritol is 2 parts by weight or below per 100 parts of the TCNQ salt, the effects of the catalysts are not significant. In amounts of pentaerythritol over 3 parts by weight, inclusive, the suppression effect appears.

The maximum amount of pentaerythritol or polyhydric alcohols should be 60 parts by weight per 100 parts of the TCNQ salt because the resistance of the salt sharply changes when the amount exceeds 60 parts by weight.

When erythritol having a melting point of 122° C. was used instead of pentaerythritol, uniform melts with organic semiconductors were obtained at about 150° C. Addition of fine metallic powders to the mixtures was confirmed to contribute greatly to suppression of HCN evolution.

EXAMPLE 5

When quiniolinium(TCNQ)$_2$ was thermally decomposed at 300° C., about 3 wt% of HCN was evolved. To 100 parts by weight of the organic semiconductor were added 15 parts by weight of each of sorbitol, mannitol and glucose and 7 parts by weight of a nickel catalyst supported on diatomaceous earth having a nickel content of 45 wt%. More particularly, sorbitol, mannitol and glucose were, respectively, melted at 150° C., 170° C. and 170° C., to which the organic semiconductor and the nickel catalyst were added, followed by well kneading each mixture. The mixtures were thermally decomposed in the same manner as in Example 4, whereupon it was recognized that the mixtures were decomposed without melting. The amount of evolved HCN after the decomposition was found to be 1 mg or below per 100 mg of the mixture in all cases, i.e. 0.60 mg for the mixture comprising sorbitol, 0.50 mg for the mixture comprising mannitol, and 0.73 mg for the mixture comprising glucose.

When the above procedure was repeated using tetrathiafluvalenium(TCNQ), 20 parts by weight of mannitol and 6 parts by weight of nickel-on-diatomaceous earth per 1000 parts by weight of the TCNQ salt, evolution of HCN could be reduced from 2.5 wt% (no additive) to 0.011 wt%.

EXAMPLE 6

To 100 parts by weight of N-methylphenazinium(TCNQ) were 20 parts by weight of mannitol and 10 parts of a copper-on-alumina catalyst, followed by adding 10 parts by weight of polyvinyl butyral dissolved in isopropanol and mixing by the use of a three-roll mill, thereby obtain a paste composition. Subsequently, the composition was applied onto a ceramic substrate by means of a doctor blade in a thickness of about 40 μm and dried at 150° C. to obtain a conductive film. 1 mg of the film was sampled and thermally decomposed in the same manner as in Example 4. As a result, it was found that HCN was evolved in an amount of 0.02 μg. When mannitol alone was added, the amount of 0.1 μg. On the other hand, when copper alone was added, an amount of HCN was 2.5 μg. In view of these facts, it was found that the copper catalyst showed a remarkable synergistic effect.

EXAMPLE 7

Different amounts of saccharides including fructose, glucose, sucrose and starch and 10 mg of N-n-butylisoquinolinium(TCNQ)$_2$ were each mixed in a mortar, followed by repeating the procedure of Example 1 or 4. The results are shown in Table 3 below.

TABLE 3

| Saccharide | Amount (%) | Amount of HCN (mg) | Burst of Tube |
|---|---|---|---|
| Nil | — | 4.2 | yes |
| Fructose | 1 | 4.0 | yes |
| " | 2 | 3.9 | no |
| " | 5 | 1.2 | no |
| " | 10 | 1.0 | no |
| " | 20 | 0.8 | no |
| " | 50 | 0.3 | no |
| Glucose | 10 | 0.9 | no |
| Sucrose | 5 | 1.3 | no |
| " | 10 | 1.0 | no |
| " | 20 | 0.7 | no |
| Starch | 10 | 1.5 | no |
| " | 20 | 1.2 | no |

As will be seen from the above results, when saccharides are added in amounts of 2 wt% or more based on the TCNQ salt, evolution of HCN is suppressed significantly. The amount of saccharides may be not limited when it is not less than 2 wt%, but if too large amounts are used, the properties of TCNQ salts as semiconductors are impeded. When the amount exceeds 60 wt%, the resulting composition is abruptly converted into an insulative composition. Accordingly, the amount of saccharides is in the range of from 2 to 60 wt% of the organic semiconductor.

EXAMPLE 8

K(TCNQ) was mixed with 10 wt% of glucose based the TCNQ salt at 265° C., whereupon the mixture melted uniformly. The amount of evolution of HCN was measured in the same manner as in Example 7, with the result that 0.12 μg of HCN was evolved per mg of the mixture composition. This value was much lower than 2 μg attained by the case where no additive was used.

EXAMPLE 9

1.5 g of starch was added to 8.5 g of N-methylphenazinium(TCNQ), to which a solution of 2 g polyvinyl butyral in benzyl alcohol was added. The resulting solution was applied onto a ceramic substrate by a printing method to form a conductive film. 1 mg of the film was sampled and thermally decomposed in the same manner a in Example 6 to measure an amount of evolved HCN, revealing that 0.15 μg of HCN was evolved. In the case where no starch was added, an amount of HCN was 3 μg. Thus, the effect of the additive was remarkable.

EXAMPLE 10

Quinolinium(TCNQ)$_2$ used as an ion radical salt of TCNQ was mixed with fine powder of each of iron, cobalt and nickel, followed by thermal decomposition in air at 300° C. for 10 minutes. Evolution of HCN was detected by the use of Kitagawa's detection tube, followed by quantitatively determining an amount of HCN by the gas chromatography and the method prescribed in JIS K109. The amounts of HCN per mg of the TCNQ salt are shown in Table 4.

TABLE 4

| Additive | Particle Size (angstrom) | Amount (%) | Amount of HCN (μg) |
|---|---|---|---|
| nil | — | — | 20.0 |
| iron | 150 | 2 | 19.5 |
| iron | 150 | 5 | 9.0 |
| iron | 150 | 10 | 7.5 |
| iron | 150 | 15 | 6.2 |
| iron | 150 | 25 | 4.1 |
| cobalt | 450 | 5 | 9.5 |
| cobalt | 450 | 10 | 8.0 |
| cobalt | 450 | 15 | 7.0 |
| nickel | 200 | 2 | 20.0 |
| nickel | 200 | 4 | 15.0 |
| nickel | 200 | 5 | 9.5 |
| nickel | 200 | 10 | 8.0 |
| nickel | 200 | 15 | 7.0 |

As will be clear from the above results, when iron or nickel is added in an amount 2 or 4 wt%, significant changes do not take place with regard to the amount of HCN as compared with the case using no metal additives. However, it was confirmed that when the metals were added in amounts exceeding 5 wt%, inclusive, the amount of evolved HCN was reduced significantly.

Larger amounts of these metals produce better suppression effects, but too much amounts are disadvantageous in that semiconductive characteristics of organic semiconductors are lost. Accordingly, the amount of the metals is in the range of from 5 to 20 wt% of an organic semiconductor.

EXAMPLE 11

The procedure of Example 10 was repeated except that N-n-propylquinolinium(TCNQ)$_2$ was used and nickel supported on alumina (nickel content: 50 wt%) was used in an amount of from 5 to 50 wt%, i.e. an amount of nickel ranging from 2.5 to 25 wt%, in order to measure an amount of evolved HCN. The results are shown in Table 5 below.

TABLE 5

| Amount (wt %) | Amount of Evolved HCN (μg) |
|---|---|
| nil | 50 |
| 5 | 35 |
| 10 | 15 |

TABLE 5-continued

| Amount (wt %) | Amount of Evolved HCN (μg) |
|---|---|
| 20 | 10 |
| 50 | 2 |

The results reveal the tendency that an increasing amount of nickel results in a sharp reduction in amount of evolved HCN. When the additive is used in an amount of 10 wt% (nickel content: 5%), the amount of evolved HCN reduces to below ⅓ of the amount of HCN generated from the nickel-free composition.

EXAMPLE 12

N-n-Butylisoquinolinium(TCNQ)$_2$ was provided as an organic semiconductor, to which 20 wt%, based on the TCNQ salt, of nickel powders having sizes of 200 angstrom, 500 angstrom and 3 μm, were added, respectively, followed by heating to temperatures not lower than 260° C. and impregnating in a wound aluminum electrolytic capacitor. The capacitor was sealed in an aluminum casing by the use of an epoxy resin. When each electrolytic capacitor was heated to 400° C. for about 20 minutes, the epoxy resin was broken whereupon the decomposition product of the organic semiconductor was blown off. At this time, an amount of evolved HCN was measured with the following results.

TABLE 6

| Size of Nickel Powder | Amount of Evolved HCN |
|---|---|
| nil | 100 ppm |
| 3 um | 50 ppm |
| 500 angstrom | 9 ppm |
| 200 angstrom | 7 ppm |

The above results demonstrate that the fine powders of nickel having a size of 500 angstrom or below have a greater suppression effect than the cases using no nickel powder and the nickel powder having a size of 3 μm.

EXAMPLE 13

N-n-Propylquinolinium(TCNQ)$_2$ was mixed with a ethylene/vinyl acetate resin binder and printed on a flat plate to make a temperature sensor. Separately, 10 wt% of cobalt-on-diatomaceous earth (having a cobalt content of 45 wt%) was added to a mixture of the TCNQ salt and the resin, which was used to make a temperature sensor. The sensors were each heated at 300° C. for about 10 minutes. The amount of evolved HCN was below 1 mg per 100 mg of the organic semiconductor when cobalt was added. This amount was much reduced as compared with 20 mg in the case where no cobalt was added.

The finely powder metals useful in the present invention are iron, nickel, cobalt and mixtures thereof. Other metals may be used in combination, if necessary. The amount of the metal is in the range of from 5 wt% to 20 wt% of the organic semiconductor used. The powder should preferably have an average particle size of 500 angstrom or below.

EXAMPLE 14

Several organic semiconductor compositions were prepared using 100 parts by weight of N-n-butylisoquinolinium(TCNQ)$_2$ and different amounts of polyhydric alcohols such as pentaerythritol, sorbitol and mannitol. For comparison, the above TCNQ salt alone was used.

First, the polyhydric alcohols were each added to the TCNQ salt semiconductor and mixed in a mortar. 40 mg of the mixture was charged in an aluminum case having a diameter of 5 mm and a height of 10.5 mm and melted on a hot plate at 250° C. to give a melt. A wind-up unit of a convolutely wound aluminum electrolytic capacitor for 100 V having a rating of 4.7 μF was immersed in the melt until satisfactory impregnation was performed. Thereafter, the unit including the aluminum case was quenched with liquid nitrogen down to room temperature. It took about 25 seconds before uniform melting of the organic semiconductor composition comprising the polyhydric alcohol was complete, about 30 seconds during which the wind-up unit was immersed, and about 15 seconds for the immersion in liquid nitrogen for cooling. The wind-up unit of the capacitor was used after chemical conversion treatment of aluminum at end surfaces thereof.

Finally, the aluminum case was sealed with a resin at the top thereof to complete a solid electrolytic capacitor. The capacitor element was placed in a 1 liter glass tube, which was then hermetically sealed. Subsequently, an inverse current of 1 A was applied to the capacitor. About 10 to 20 seconds after the application, the element was heated to over 300° C. and bursted, whereupon decomposed organic semiconductor was blown off. A whitish yellow gas was evolved and measured by the use of Kitagawa's gas detector tube. The results are shown in Table 7 along with initial characteristics of each capacitor.

TABLE 7

| Polyhydric Alcohol | Amount (parts by wt.) | Time Before Bursting (seconds) | Amount of HCN (ppm) | Initial Characteristics at 120 Hz | |
|---|---|---|---|---|---|
| | | | | C(μF) | tan δ(%) |
| nil | — | 30 | 2000 | 4.05 | 1.5 |
| pentaerythritol | 2 | 15 | 1000 | 4.10 | 1.8 |
| pentaerythritol | 5 | 9 | 200 | 3.90 | 2.0 |
| pentaerythritol | 10 | 10 | 80 | 4.01 | 2.5 |
| Sorbitol | 10 | 10 | 90 | 3.90 | 2.6 |
| " | 20 | 7 | 50 | 3.72 | 3.1 |
| Mannitol | 10 | 9 | 100 | 3.95 | 3.0 |
| Erythritol | 10 | 11 | 90 | 3.95 | 2.6 |

As will be appreciated from the above results, the amount of evolved HCN can be suppressed to a substantial extent when polyhydric alcohols are added to the organic semiconductor.

EXAMPLE 15

The general procedure of Example 14 was repeated using 10 parts by weight of N-n-propylquinolinium(TCNQ)$_2$ and 10, 20 and 50 parts by weight of sorbitol. When applied to solid electrolytic capacitors, the organic semiconductor compositions should preferably comprise polyhydric alcohols in an amount of from 5 to 50 wt% of the organic semiconductor in view of the change in electrical characteristics of the capacitor. The results are shown in Table 8 below.

TABLE 8

| Amount of Sorbitol (parts by weight) | Time Before Bursting (seconds) | Amount of HCN (ppm) | Initial Characteristics at 120 Hz | |
|---|---|---|---|---|
| | | | C(μF) | tan δ(%) |
| nil | 34 | 2500 | 3.98 | 1.7 |
| 10 | 9 | 100 | 4.00 | 2.5 |
| 20 | 11 | 60 | 3.72 | 3.1 |
| 50 | 5 | 20 | 3.43 | 5.2 |

The above results reveal that the evolution of HCN is remarkably suppressed to a greater extent at a greater amount of sorbitol.

Similar results were obtained when there were used, instead of polyhydric alcohols, saccharides such as fructose, starch and the like, and metallic fine powders such as iron, nickel and cobalt. In this connection, saccharides should be preferred to be used in an amount of from 5 to 50 wt% of an organic semiconductor for similar reasons as with polyhydric alcohols. Moreover, the evolution of HCN was further suppressed when metal catalysts such as iron, nickel, cobalt and copper were used in combination with polyhydric alcohols.

What is claimed is:

1. An organic semiconductive composition comprising a CN group-bearing organic semiconductive ion radical salt, and a polyhydric alcohol used in an amount of 5 to 60 wt% of said ion radical salt whereby a toxic gas evolved from said ion radical salt, when said salt is excessively heated, is reduced to a substantial extent by the action of said polyhydric alcohol.

2. An organic semiconductive composition according to claim 1, wherein said CN group-bearing organic semiconductive ion radical salt is a ion radical salt of 7,7,8,8-tetracyanoquinodimethane.

3. An organic semiconductive composition according to claim 1, wherein said salt consists of a 7,7,8,8-tetracyanoquinodimethane acceptor and a donor selected from the group consisting of metal ions and ammonium.

4. An organic semiconductor composition according to claim 1, wherein said salt consists of a 7,7,8,8-tetracyanoquinodimethane acceptor and a donor selected from the group consisting of unsubstituted or substituted pyridinium, quinolinium, isoquinolinium, phenazinium, acridinium, phenothiazinium, tetrathiafluvalenium and tetraselenafluvalenium.

5. An organic semiconductive composition according to claim 4, wherein the pyridinium, quinolinium, isoquinolinium, phenazinium, acridinium, phenothiazinium, tetrathiafluvalenium or tetraselenafluvalenium have a normal alkyl group substituent at the N position thereof.

6. An organic semiconductive composition according to claim 1, wherein said polyhydric alcohol is pentaerythritol, erythritol, sorbitol, mannitol, glucose or mixtures thereof.

7. An organic semiconductive composition according to claim 1, further comprising 1 to 10 wt% of fine powder of a metal selected from the group consisting of iron, cobalt, nickel, copper and mixtures thereof.

8. An organic semiconductive composition comprising a CN group-bearing organic semiconductive ion radical salt, and a saccharide used in an amount of 2 to 60 wt% of said ion radical salt whereby a toxic gas evolved from said ion radical salt, when said salt is excessively heated, is reduced to a substantial extent by the action of said saccharide.

9. An organic semiconductive composition according to claim 8, wherein said CN group-bearing organic semiconductive ion radical salt is a ion radical salt of 7,7,8,8-tetracyanoquinodimethane.

10. An organic semiconductive composition according to claim 8, wherein said salt consists of a 7,7,8,8-tetracyanoquinodimethane acceptor and a donor selected from the group consisting of metal ions and ammonium.

11. An organic semiconductive composition according to claim 8, wherein said salt consists of a 7,7,8,8-tetracyanoquinodimethane acceptor and a donor selected from the group consisting of unsubstituted or substituted pyridinium, quinolinium, isoquinolinium, phenazinium, acridinium, phenothiazinium, tetrathiafluvalenium and tetraselenafluvalenium.

12. An organic semiconductive composition according to claim 11, wherein the pyridinium, quinolinium, isoquinolinium, phenazinium, acridinium, phenothiazinium, tetrathiafluvalenium or tetraselenafluvalenium have a normal alkyl group substituent at the N position thereof.

13. An organic semiconductive composition according to claim 9, wherein said saccharide has a melting point of 100° C. or higher and is a member selected from the group consisting of monosaccharides, oligosaccharides and polysaccharides.

14. An organic semiconductive composition comprising a CN group-bearing organic semiconductive ion radical salt, and a fine powder of a metal selected from the group consisting of iron, cobalt, nickel and mixtures thereof and used in an amount of 5 to 20 wt% of said ion radical salt whereby a toxic gas evolved from said ion radical salt, when said salt is excessively heated, is reduced to a substantial extent by the action of said fine powder.

15. An organic semiconductive composition according to claim 14, wherein said CN group-bearing organic semiconductive ion radical salt is a ion radical salt of 7,7,8,8-tetracyanoquinodimethane.

16. An organic semiconductive composition according to claim 14, wherein said salt consists of a 7,7,8,8-tetracyanoquinodimethane acceptor and a donor selected from the group consisting of metal ions and ammonium.

17. An organic semiconductor composition according to claim 14, wherein said salt consists of a 7,7,8,8-tetracyanodimethane acceptor and a donor selected from the group consisting of unsubstituted or substituted pyridinium, quinolinium, isoquinolinium, phenazinium, acridinium, phenothiazinium, tetrathiafluvalenium and tetraselenafluvalenium.

18. An organic semiconductive composition according to claim 17, wherein the pyridinium, quinolinium, isoquinolinium, phenazinium, acridinium, phenothiazinium, tetrathiafluvalenium or tetraselenafluvalenium have a normal alkyl group substituent at the N position thereof.

19. An organic semiconductive composition according to claim 14, wherein said fine powder has an average size of 500 angstrom or below.

20. A solid electrolytic capacitor comprising a first electrode having an oxide film on the surface thereof, a second electrode in spaced relation with said first electrode, and a solid electrolyte provided between the first and second electrodes, said solid electrolyte comprising a CN group-bearing organic semiconductive ion radical salt, and a polyhydric alcohol used in an amount of 5 to 60 wt% of said ion radical salt whereby a toxic gas evolved from said ion radical salt, when said salt is excessively heated, is reduced to a substantial extent by the action of said polyhydric alcohol.

21. A solid electrolytic capacitor according to claim 20, wherein said CN group-bearing organic semiconductive ion radical salt is a ion radical salt of 7,7,8,8-tetracyanoquinodimethane.

22. A solid electrolytic capacitor according to claim 21, wherein said ion radical salt of a 7,7,8,8-tetracyanoquinodimethane is a member selected from the group consisting of quinolinium(7,7,8,8-tetracyanoquinodimethane)$_2$, N-methylphenazinium(7,7,8,8-tetracyanoquinodimethane), N-methylacridinium(7,7,8,8-tetracyanoquinodimethane)$_2$, and tetrathiafluvalenium(7,7,8,8-tetracyanoquinodimethane).

23. A solid electrolytic capacitor according to claim 21, wherein said ion radical salt of a 7,7,8,8-tetracyanoquinodimethane is a member selected from the group consisting of salts of 7,7,8,8-tetracyanoquinodimethane and quinoline or isoquinoline having an n-alkyl group at the N position thereof.

24. A solid electrolytic capacitor according to claim 20, wherein said polyhydric alcohol is pentaerythritol, erythritol, sorbitol, mannitol, glucose or mixtures thereof.

25. A solid electrolytic capacitor according to claim 24, wherein said polyhydric alcohol is used in an amount of from 5 to 50 wt% of the ion radical salt.

26. A solid electrolytic capacitor according to claim 20, further comprising 1 to 10 wt% of fine powder of a metal selected from the group consisting of iron, cobalt, nickel, copper and mixtures thereof.

27. A solid electrolytic capacitor comprising a first electrode having an oxide film on the surface thereof, a second electrode in spaced relation with said first electrode, and a solid electrolyte provided between the first and second electrodes, said solid electrolyte comprising a CN group-bearing organic semiconductive ion radical salt, and a saccharide used in an amount of 2 to 60 wt% of said ion radical salt whereby a toxic gas evolved from said ion radical salt, when said salt is excessively heated, is reduced to a substantial extent by the action of said saccharide.

28. A solid electrolytic capacitor according to claim 27, wherein said CN group-bearing organic semiconductive ion radical salt is a ion radical salt of 7,7,8,8-tetracyanoquinodimethane.

29. A solid electrolytic capacitor according to claim 27, wherein said ion radical salt of a 7,7,8,8-tetracyanoquinodimethane is a member selected from the group consisting of quinolinium(7,7,8,8-tetracyanoquinodimethane)$_2$, N-methylphenazinium(7,7,8,8-tetracyanoquinodimethane), N-methylacridinium(7,7,8,8-tetracyanoquinodimethane)$_2$, and tetrathiafluvalenium(7,7,8,8-tetracyanoquinodimethane).

30. A solid electrolytic capacitor according to claim 27, wherein said ion radical salt of a 7,7,8,8-tetracyanoquinodimethane is a member selected from the group consisting of salts of 7,7,8,8-tetracyanoquinodimethane and quinoline or isoquinoline having an N-alkyl group at the N position thereof.

31. A solid electrolytic capacitor according to claim 27, wherein said saccharide has a melting point of 100° C. or over and is selected from the group consisting of monosaccharides, oligosaccharides and polysaccharides.

32. A solid electrolytic capacitor according to claim 27, wherein said saccharide is used in an amount of from 5 to 50 wt% of the ion radical salt.

33. A solid electrolytic capacitor comprising a first electrode having an oxide film on the surface thereof, a second electrode in spaced relation with said first electrode, and a solid electrolyte provided between the first and second electrodes, said solid electrolyte comprising a CN group-bearing organic semiconductive ion radical salt, and fine powder of a metal selected from the group consisting of iron, cobalt, nickel and mixtures thereof and used in an amount of 5 to 20 wt% of said ion radical salt whereby a toxic gas evolved from said ion radical salt, when said salt is excessively heated, is reduced to a substantial extent by the action of said fine powder.

34. A solid electrolytic capacitor according to claim 33, wherein said CN group-bearing organic semiconductive ion radical salt is a ion radical salt of 7,7,8,8-tetracyanoquinodimethane.

35. A solid electrolytic capacitor according to claim 33, wherein said ion radical salt of a 7,7,8,8-tetracyanoquinodimethane is a member selected from the group consisting of quinolinium(7,7,8,8-tetracyanoquinodimethane)$_2$, N-methylphenazinium(7,7,8,8-tetracyanoquinodimethane), N-methylacridinium(7,7,8,8-tetracyanoquinodimethane)$_2$, and tetrathiafluvalenium(7,7,8,8-tetracyanoquinodimethane).

36. A solid electrolytic capacitor according to claim 33, wherein said ion radical salt of a 7,7,8,8-tetracyanoquinodimethane is a member selected from the group consisting of salts of 7,7,8,8-tetracyanoquinodimethane and quinoline or isoquinoline having an n-alkyl group at the N position thereof.

37. A solid electrolytic capacitor according to claim 33, wherein the fine powder has an average size of 500 angstrom or below.

* * * * *